US011878535B2

(12) United States Patent
Nagashima et al.

(10) Patent No.: US 11,878,535 B2
(45) Date of Patent: Jan. 23, 2024

(54) CARTRIDGE

(71) Applicant: SEIKO EPSON CORPORATION, Tokyo (JP)

(72) Inventors: Takumi Nagashima, Matsumoto (JP); Yoshihiro Koizumi, Shiojiri (JP); Shun Oya, Kiso-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 91 days.

(21) Appl. No.: 17/698,479

(22) Filed: Mar. 18, 2022

(65) Prior Publication Data

US 2022/0297438 A1 Sep. 22, 2022

(30) Foreign Application Priority Data

Mar. 19, 2021 (JP) ................................ 2021-045568

(51) Int. Cl.
*B41J 2/175* (2006.01)

(52) U.S. Cl.
CPC ................................ *B41J 2/17553* (2013.01)

(58) Field of Classification Search
CPC ............................ B41J 2/17553; B41J 2/1752
USPC ............................................................ 347/86
See application file for complete search history.

(56) References Cited

U.S. PATENT DOCUMENTS

RE36,279 E * 8/1999 Ujita .................... B41J 2/17503 347/14
8,297,738 B1 10/2012 Kodama et al.
2008/0036828 A1 2/2008 Koike et al.
2008/0165232 A1 7/2008 Yuen
2008/0284810 A1 11/2008 Shimizu et al.
2012/0056955 A1 3/2012 Kodama et al.
2012/0200646 A1 8/2012 Karasawa et al.
2013/0182046 A1* 7/2013 Kodama .............. B41J 2/17526 347/85
2013/0208051 A1 8/2013 Koizumi
2014/0043408 A1 2/2014 Kudo et al.
2014/0253646 A1 9/2014 Koike et al.
2015/0306882 A1 10/2015 Kudo et al.
2016/0159099 A1 6/2016 Kudo et al.
2017/0120613 A1 5/2017 Ikebe et al.
2018/0281435 A1 10/2018 Yoshimoto et al.

FOREIGN PATENT DOCUMENTS

CN 103568581 A 2/2014
EP 2 727 733 A1 5/2014
EP 2 772 360 A2 9/2014

(Continued)

*Primary Examiner* — Matthew Luu
*Assistant Examiner* — Alexander D Shenderov
(74) *Attorney, Agent, or Firm* — Oliff PLC

(57) ABSTRACT

A cartridge includes: a liquid containing body including a liquid containing portion containing the liquid and a liquid supply portion; and an adapter attached to the liquid containing body and including a terminal arrangement portion which is located on one end side of the adapter in a longitudinal direction and in which a cartridge-side terminal electrically coupled to the apparatus-side terminal is arranged, and an insertion opening portion through which the liquid introduction portion is inserted, in which the adapter has a notch located between the terminal arrangement portion and the insertion opening portion in the longitudinal direction.

5 Claims, 7 Drawing Sheets

(56) References Cited

FOREIGN PATENT DOCUMENTS

| | | | |
|---|---|---|---|
| EP | 3 231 616 | A1 | 10/2017 |
| EP | 3 459 744 | A1 | 3/2019 |
| JP | 2007-283557 | A | 11/2007 |

* cited by examiner

CARTRIDGE

The present application is based on, and claims priority from JP Application Serial Number 2021-045568, filed Mar. 19, 2021, the disclosure of which is hereby incorporated by reference herein in its entirety.

BACKGROUND

1. Technical Field

The present disclosure relates to a technology for a cartridge.

2. Related Art

In the related art, a cartridge composed of a plurality of members has been known (see JP-A-2007-283557). In a technology of a related art, at least one of the plurality of members is molded from a material containing polylactic acid in order to control deformation of the members during manufacturing and improve dimensional accuracy of the plurality of members.

In the technology of the related art, there is a need for a material containing polylactic acid to be used as a material of the member, and a degree of freedom in selecting the material of the member may decrease. When the material of the members is restricted, it may be difficult for the members of the cartridge to have other functions such as impact resistance, assembly resistance, and chemical resistance, for example. Further, in the technology of the related art, the member is molded from the material containing polylactic acid. However, dimensional accuracy of the member cannot be sufficiently improved only with the material, and a positional deviation of elements included in the member can occur.

SUMMARY

According to an aspect of the present disclosure, there is provided a cartridge that is detachably mounted in a cartridge mounting portion of a printing apparatus including an apparatus-side terminal and a liquid introduction portion receiving a liquid. The cartridge includes: a liquid containing body including a liquid containing portion containing the liquid and a liquid supply portion; and an adapter attached to the liquid containing body and including a terminal arrangement portion which is located on one end side of the adapter in a longitudinal direction and in which a cartridge-side terminal electrically coupled to the apparatus-side terminal is arranged, and an insertion opening portion through which the liquid introduction portion is inserted, in which the adapter has a notch located between the terminal arrangement portion and the insertion opening portion in the longitudinal direction.

DESCRIPTION OF EXEMPLARY EMBODIMENTS

A. Embodiment

A-1. Configuration of Printing System

Figure 1:
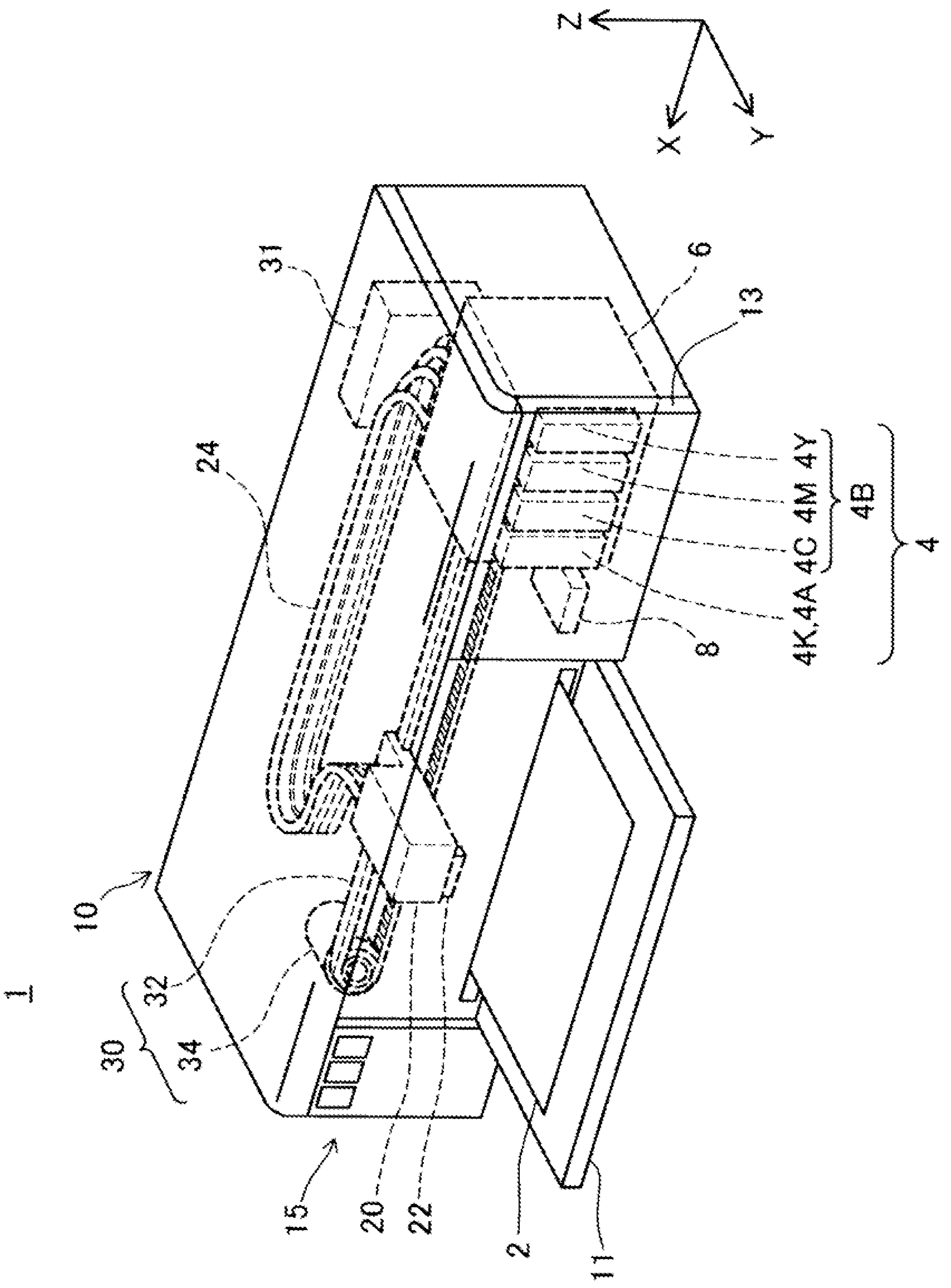
FIG. 1 is a perspective view illustrating a configuration of a printing system as an embodiment of the present disclosure.

FIG. 1 is a perspective view illustrating a configuration of a printing system 1 as an embodiment of the present disclosure. In FIG. 1, X, Y, and Z axes, which are three orthogonal spatial axes, are drawn. The directions in which the arrows of the X axis, the Y axis, and the Z axis are directed represent positive directions along the X axis, the Y axis, and the Z axis, respectively. The positive directions along the X axis, the Y axis, and the Z axis are denoted by a +X direction, a +Y direction, and a +Z direction, respectively. The reverse directions of the directions in which the arrows of the X axis, the Y axis, and the Z axis are directed are negative directions along the X axis, the Y axis, and the Z axis, respectively. The negative directions along the X axis, the Y axis, and the Z axis are denoted by a −X direction, a −Y direction, and a −Z direction, respectively. Directions along the X axis, the Y axis, and the Z axis regardless of whether being positive or negative are called an X direction, a Y direction, and a Z direction, respectively. This applies the same to the figures and descriptions to be described later.

The printing system 1 includes a printing apparatus 10, and a cartridge 4 supplying ink, which is a liquid, to the printing apparatus 10.

The printing apparatus 10 in the present embodiment is an ink jet printer that discharges the ink, as a liquid, from a discharge head 22. The printing apparatus 10 is a large printer that performs printing on a large-sized sheet (A2 to A0, and the like) such as a poster. The printing apparatus 10 includes a cartridge mounting portion 6, a control portion 31, a carriage 20, a discharge head 22, and a drive mechanism 30. In addition, the printing apparatus 10 includes an operation button 15 for a user to operate operations of the printing apparatus 10.

A plurality of cartridges 4 are detachably mounted in the cartridge mounting portion 6. In the present embodiment, four types of cartridges 4, corresponding to ink having four colors of black, yellow, magenta, and cyan, are mounted in the cartridge mounting portion 6 one by one, that is, a total of four cartridges 4 are mounted in the cartridge mounting portion 6. The cartridge 4 containing black ink is referred to as a cartridge 4K, the cartridge 4 containing yellow ink is referred to as a cartridge 4Y, the cartridge 4 containing magenta ink is referred to as a cartridge 4M, and the cartridge 4 containing cyan ink is referred to as a cartridge 4C. In the present embodiment, the cartridge 4K is configured to contain more liquid than the cartridges 4C, 4M, and 4Y. Thus, the cartridge 4K is referred to as a first-type cartridge 4A, and the cartridges 4C, 4M, and 4Y are referred to as a second-type cartridge 4B.

The printing apparatus 10 has a replacement cover 13 on a front surface thereof in the +Y direction side. When the +Z direction side of the replacement cover 13 is tilted forward, that is, tilted to the +Y direction side, an opening of the cartridge mounting portion 6 appears and the cartridge 4 can be detached. When the cartridge 4 is mounted in the cartridge mounting portion 6, the ink can be supplied to the discharge head 22 that is provided on the carriage 20 via a tube 24 as a liquid circulating tube. In the present embodiment, the ink is supplied from the cartridge 4 to the discharge head 22 with a head difference. Specifically, the ink is supplied to the discharge head 22 due to a head difference between a liquid level of the ink in the cartridge mounting portion 6 and the discharge head 22. In another embodiment, a pump mechanism (not illustrated) of the printing apparatus 10 may suck the ink in the cartridge 4 to supply the ink to the discharge head 22. The tube 24 is provided for each type of the ink. Here, a state in which the cartridge 4 is mounted in the cartridge mounting portion 6 and the ink, as a liquid, can be supplied to the printing apparatus 10 is referred to as a "mounted state".

A nozzle for each type of ink is provided on the discharge head 22. The discharge head 22 discharges the ink from the nozzle toward a printing sheet 2 and prints data such as characters or images on the printing sheet 2. In the present embodiment, the printing apparatus 10 is a so-called "off-carriage type" printer in which the cartridge mounting portion 6 is not interlocked with the movement of the carriage 20. A technology of the present disclosure can also be applied to a so-called "on-carriage type" printer in which the cartridge mounting portion 6 is provided on the carriage 20 and the cartridge mounting portion 6 moves together with the carriage 20.

The control portion 31 controls each portion of the printing apparatus 10, and transmits and receives a signal to and from the cartridge 4. The carriage 20 relatively moves the discharge head 22 to the printing sheet 2.

The drive mechanism 30 reciprocates the carriage 20 based on a control signal from the control portion 31. The drive mechanism 30 includes a timing belt 32 and a drive motor 34. The carriage 20 reciprocates in a main scanning direction, which is a direction along the X direction, by transmitting power of the drive motor 34 to the carriage 20 via the timing belt 32. In addition, the printing apparatus 10 includes a transport mechanism for moving the printing sheet 2 in a sub-scanning direction which is the +Y direction. When printing is performed, the transport mechanism moves the printing sheet 2 in the sub-scanning direction, and the printed printing sheet 2 is output onto a front cover 11.

A region called a home position is provided at a position outside a printing region where the carriage 20 is moved in the main scanning direction, and a maintenance mechanism that performs maintenance to normally perform printing is mounted at the home position. The maintenance mechanism includes a cap member 8 that is pushed against a surface where the nozzle is formed on a bottom surface side of the discharge head 22 and forms a closed space so as to surround the nozzle, a lifting mechanism (not illustrated) that lifts the cap member 8 to be pushed against a nozzle surface of the discharge head 22, a suction pump (not illustrated) that introduces a negative pressure into the closed space where the cap member 8 is formed by being pushed against the nozzle surface of the discharge head 22, and the like.

In the present embodiment, in the use state of the printing system 1, an axis along the sub-scanning direction of transporting the printing sheet 2 is defined as the Y axis, an axis along the gravity direction is defined as the Z axis, and an axis along the movement direction of the carriage 20 is defined as the X axis. Here, "the use state of the printing system 1" refers to a state in which the printing system 1 is installed on a horizontal surface. In the present embodiment, the sub-scanning direction is defined as the +Y direction, a direction opposite to the +Y direction is referred to as the −Y direction, and the gravity direction is defined as the −Z direction, and the antigravity direction is defined as the +Z direction. The X direction and the Y direction are directions along the horizontal direction. When the printing system 1 is viewed from a front side, a direction from the left side to the right side is defined as the +X direction, and a direction opposite to the +X direction is defined as the −X direction. In the present embodiment, an insertion direction in which the cartridge 4 is inserted into the cartridge mounting portion 6 for mounting is defined as the −Y direction, and a direction in which the cartridge 4 is removed from the cartridge mounting portion 6 is defined as the +Y direction. Thus, in the cartridge mounting portion 6, a −Y direction side is referred to as a depth side, and a +Y direction side is referred to as a front side. In the present embodiment, an arrangement direction of the plurality of cartridges 4 is defined as the X direction.

A-2. Detailed Description of Mounted State of Cartridge 4

Figure 2:
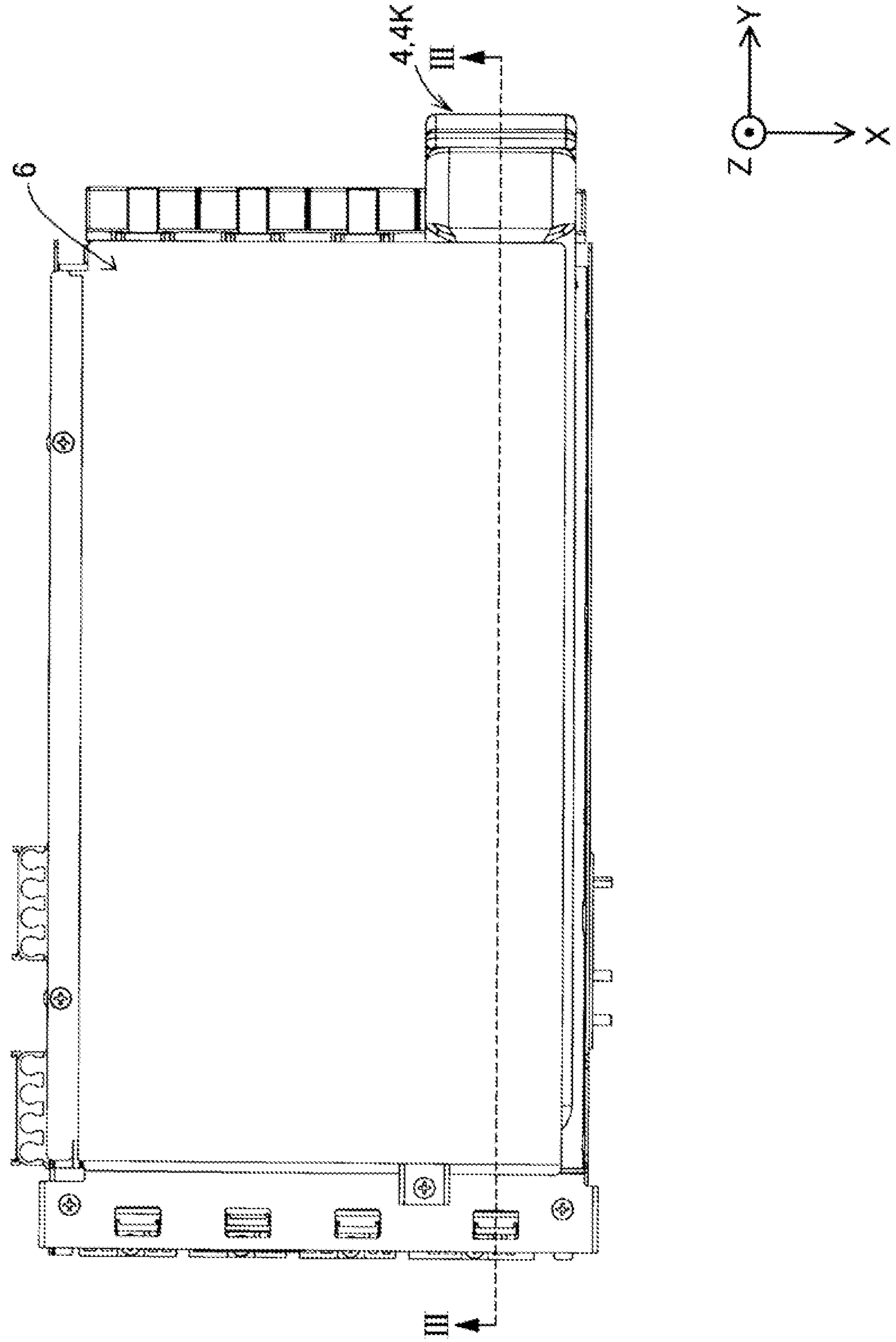
FIG. 2 is a view illustrating a cartridge mounting portion when viewed from a +Z direction.
Figure 3:
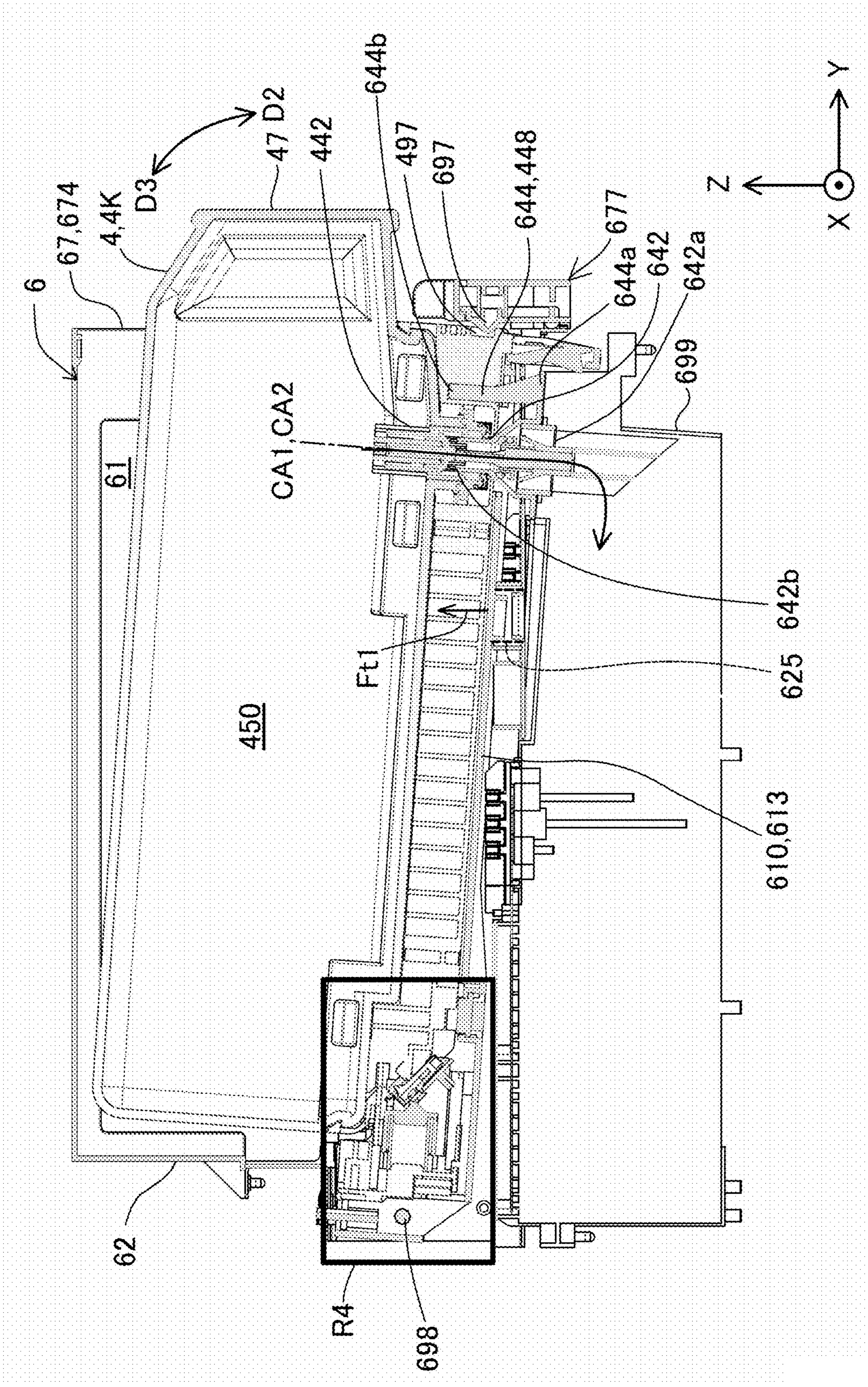
FIG. 3 is a cross-sectional view taken along line III-III in FIG. 2.
Figure 4:
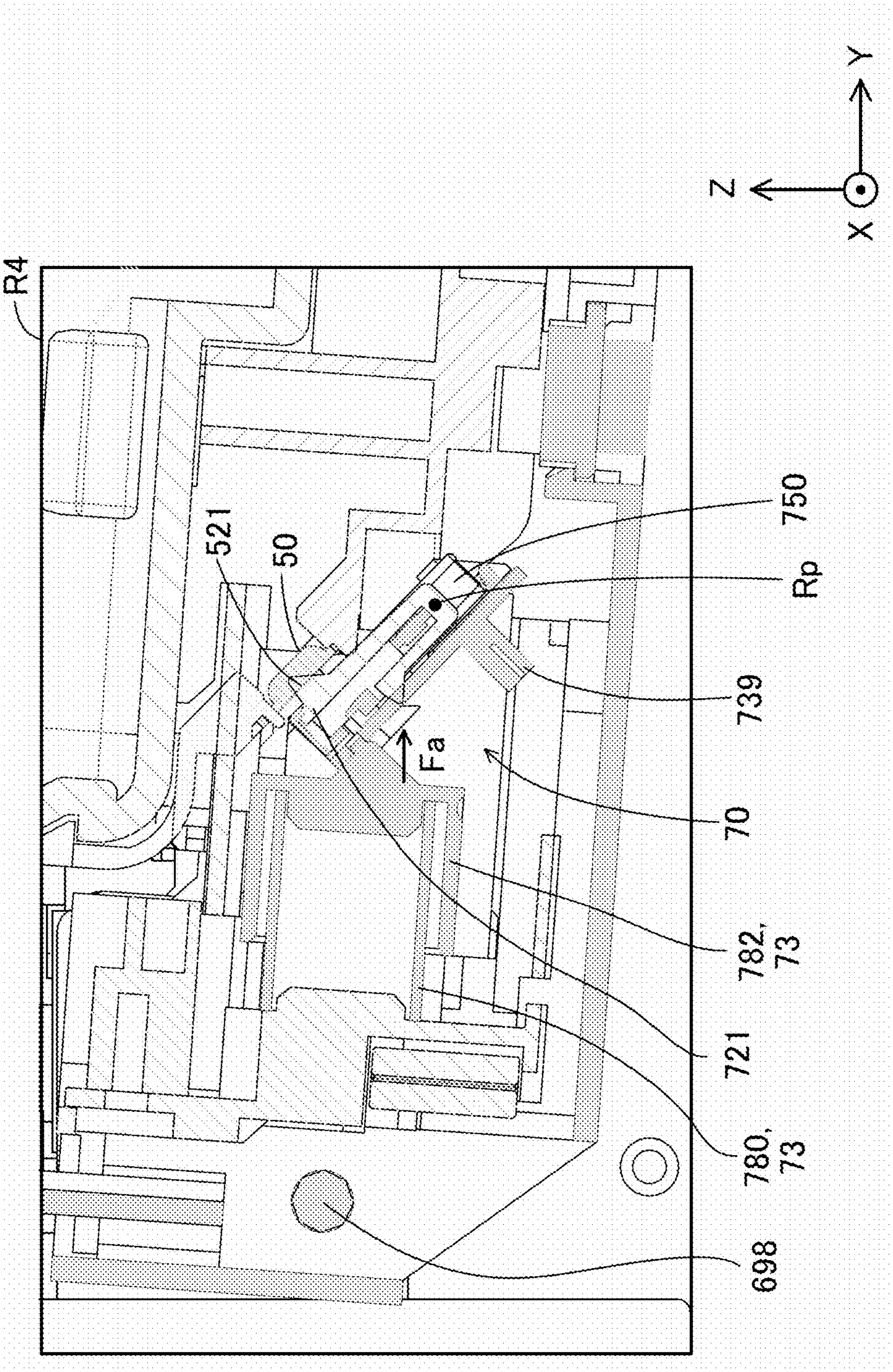
FIG. 4 is an enlarged view of a region in FIG. 3.

FIG. 2 is a view illustrating the cartridge mounting portion 6 when viewed from the +Z direction. FIG. 3 is a cross-sectional view taken along line III-III in FIG. 2. FIG. 4 is an enlarged view of region IV in FIG. 3. In FIG. 2, the cartridge 4K is mounted in the cartridge mounting portion 6. The mounting process and mounted state of the cartridge 4 will be described with reference to FIGS. 2 to 4. The mounting process and mounted state are the same for the cartridges 4C, 4M, 4Y, and 4K.

As illustrated in FIG. 3, the cartridge 4 is pushed into the cartridge mounting portion 6 along the insertion direction, which is the −Y direction, and the cartridge 4 is thus inserted into the accommodation chamber 61 of the cartridge mounting portion 6 via an insertion/removal opening portion 674 included in a first apparatus wall 67 of the cartridge mounting portion 6. As a result, the accommodation chamber 61 accommodates the cartridge 4. The insertion/removal opening portion 674 has an inlet/outlet of the cartridge 4 to the accommodation chamber 61. The cartridge 4 is supported by the support member 610 of the cartridge mounting portion 6 from the −Z direction side in a state in which the cartridge 4 is inserted into the accommodation chamber 61 of the cartridge mounting portion 6. Furthermore, the liquid supply portion 442 of the cartridge 4 is coupled to the liquid introduction portion 642 of the cartridge mounting portion 6 in the mounted state in which the cartridge 4 is mounted in the accommodation chamber 61 of the cartridge mounting portion 6. As a result, the liquid contained in a liquid containing portion 450 of the cartridge 4 is supplied to the liquid introduction portion 642 via the liquid supply portion 442. In the present embodiment, while the liquid is supplied from the liquid supply portion 442 to the liquid introduction portion 642, air contained in a liquid storage portion 699 becomes bubbles, and the bubbles circulate in the liquid introduction portion 642, the liquid supply portion 442, and the liquid containing portion 450. As a result, liquid-gas exchange in the liquid containing portion 450 is performed. In another embodiment, the cartridge 4 has an atmosphere communication path for allowing the liquid containing portion 450 to communicate with the outside, and the liquid-gas exchange may be performed via the atmosphere communication path. The atmosphere communication path is disposed at a different position from the liquid supply portion 442, and for example, is formed on a wall forming the liquid containing portion 450.

The liquid introduction portion 642 receives the liquid supplied from the cartridge 4. The liquid introduction portion 642 is a cylindrical member, and has an internal flow path for allowing the liquid to circulate therein. The liquid introduction portion 642 has a proximal end 642*a* and a distal end 642*b*. An opening communicating with an introduction portion flow path, which is the internal flow path, is formed in the distal end 642*b*, and the ink in the liquid supply portion 442 circulates through the introduction portion flow path via the opening. The proximal end 642*a* is coupled to the liquid storage portion 699, and the ink circulated through the introduction portion flow path circulates in the liquid storage portion 699. The liquid storage portion 699 is located on the −Z direction side of the accommodation chamber 61. The liquid storage portion 699 communicates with the discharge head 22 via the tube 24 illustrated in FIG. 1. As described above, the liquid introduction portion 642 communicates with the discharge head 22 via the liquid storage portion 699 and the tube 24. A central axis CA1 of the liquid introduction portion 642 is in parallel with a central axis CA2 of the liquid supply portion 442 in the mounted state, and tilted to the Z direction. That is, a direction along the central axis CA1, which is a direction in which the liquid introduction portion 642 extends, intersects with the insertion direction of the cartridge 4. A direction along the central axis CA2 of the liquid supply portion 442 is a direction along a direction in which the liquid supply portion 442 extends.

As illustrated in FIG. 4, in the mounted state of the cartridge 4, a circuit board 50 of the cartridge 4 and an apparatus-side terminal portion 70 of the cartridge mounting portion 6 are electrically coupled to each other by coming into contact with each other. The apparatus-side terminal portion 70 is held by a holding mechanism 73. The apparatus-side terminal portion 70 includes a plurality of apparatus-side terminals 721, a terminal holding portion 750, and a connector 739.

In the present embodiment, the plurality of (nine) apparatus-side terminals 721 are provided. Each of the plurality of apparatus-side terminals 721 is a metal plate member having conductivity. The apparatus-side terminal 721 has a terminal rotation fulcrum Rp, in which a portion where the terminal rotation fulcrum Rp is in contact with the cartridge-side terminal 521 of the circuit board 50, which is an end of the fulcrum, can be elastically deformed. A direction in which the portion where the terminal rotation fulcrum Rp is in contact with the cartridge-side terminal 521 of the circuit board 50 is elastically deformed is a direction along the X direction and the Z direction. The terminal holding portion 750 holds the plurality of apparatus-side terminals 721. The connector 739 is electrically coupled to the plurality of apparatus-side terminals 721. In addition, the connector 739 is electrically coupled to the control portion 31 of the printing apparatus 10 by wiring (not illustrated). As a result, data communication between the circuit board 50 and the control portion 31 is available.

The holding mechanism 73 includes a biasing member 780 and an attachment member 782. The biasing member 780 is composed of a coil spring. The biasing member 780 is disposed inside the attachment member 782. In addition, the apparatus-side terminal portion 70 is attached to the attachment member 782. The biasing member 780 is compressed in a state in which the insertion of the cartridge 4 into the cartridge mounting portion 6 is completed. As a result, the biasing member 780 applies an external force Fa via the attachment member 782 in a direction in which the apparatus-side terminal portion 70 is directed to a removal direction side of the cartridge 4, which is the first apparatus wall 67 side. Since the apparatus-side terminal portion 70 is pushed against the circuit board 50 by the external force Fa, the contact between the apparatus-side terminal 721 and the cartridge-side terminal 521 is maintained well.

As described above, the holding mechanism 73 holds the apparatus-side terminal portion 70 to be displaceable in a direction along the insertion direction of the cartridge 4. In addition, one end of the biasing member 780 on the apparatus-side terminal portion 70 side is configured to be slightly movable in the X direction and the Z direction intersecting with the insertion direction. As a result, the apparatus-side terminal portion 70 is held by a holding mechanism 73 to be slightly movable in the X direction and the Z direction intersecting with the insertion direction.

The mounting process of the cartridge 4 in the cartridge mounting portion 6 includes a terminal coupling process and a supply portion coupling process performed after the terminal coupling process. The terminal coupling process is a process in which the apparatus-side terminal 721 and the cartridge-side terminal 521 come into contact with and electrically coupled to each other by moving the cartridge 4 in the −Y direction to insert the cartridge 4 into the accommodation chamber 61 of the cartridge mounting portion 6 via the insertion/removal opening portion 674 of the first apparatus wall 67 illustrated in FIG. 3. The supply portion coupling process is a process in which the liquid introduction portion 642 and the liquid supply portion 442 are coupled to each other by rotatably moving a rear wall 47 side of the cartridge 4 in a coupling direction D2 indicated by an arrow around a rotation fulcrum 698 as a displacement mechanism of the support member 610, while maintaining a state in which the apparatus-side terminal 721 and the cartridge-side terminal 521 are electrically coupled to each other. The rotation fulcrum 698 is provided on the second apparatus wall 62 side of the cartridge mounting portion 6.

In the supply port coupling process, the movement of the liquid supply portion 442 intersecting with the central axis CA2 of the liquid supply portion 442 is restricted by entering an apparatus-side supply portion positioning portion 644, which is a protrusion included in the cartridge mounting portion 6, into a supply portion positioning portion 448 having a recess shape and included in the cartridge 4. As a result, positioning of the liquid supply portion 442 to the liquid introduction portion 642 is performed. The apparatus-side supply portion positioning portion 644 has a substantially rectangular parallelepiped shape. The apparatus-side supply portion positioning portion 644 has one end 644*a* and the other end 644*b*. One end 644*a* is located on the liquid storage portion 699 side. One end 644*a* is located closer to the accommodation chamber 61 than the other end 644*b*.

In the mounted state of the cartridge 4, a main wall 613 forming a bottom portion of the support member 610 is tilted to the Y direction. Specifically, the main wall 613 of the support member 610 is tilted so as to be located on the −Z direction side, which is a lower side, toward the +Y direction side. The main wall 613 is in parallel to the Y direction in the initial arrangement state of the cartridge mounting portion 6 in which the cartridge 4 is not mounted.

The cartridge mounting portion 6 includes the biasing member 625 that applies an external force Ft1 to the support member 610 in order to return the support member 610 to a position where the support member 610 is in the initial arrangement state. The biasing member 625 is a coil spring provided between the support member 610 and the liquid storage portion 699, and becomes a compressed state in the mounted state. The external force Ft1 having a +Z direction component is applied to the support member 610 depending on the compressed state. Meanwhile, in the mounted state of the cartridge 4, a cartridge engagement portion 497 of the cartridge 4 is engaged with a mounting engagement portion 697 of the cartridge mounting portion 6, and the mounted state is thus maintained. The mounting engagement portion 697 is formed on the engagement forming body 677 located on the first apparatus wall 67 side of the cartridge mounting portion 6.

When the cartridge 4 is removed from the cartridge mounting portion 6, the user lifts the rear wall 47 side of the cartridge 4 to be rotatably moved in a coupling release direction D3, which is a direction opposite to the coupling direction D2 about rotation fulcrum 698. As a result, the mounting engagement portion 697 is displaced by being pushed by a main body of the cartridge 4, and the engagement of the mounting engagement portion 697 and the cartridge engagement portion 497 is released. After the engagement of the mounting engagement portion 697 and the cartridge engagement portion 497 is released, the user moves the cartridge 4 in the +Y direction, which is the removal direction, to remove the cartridge 4 from the cartridge mounting portion 6.

A-3. Detailed Configuration of Cartridge 4

Figure 5:
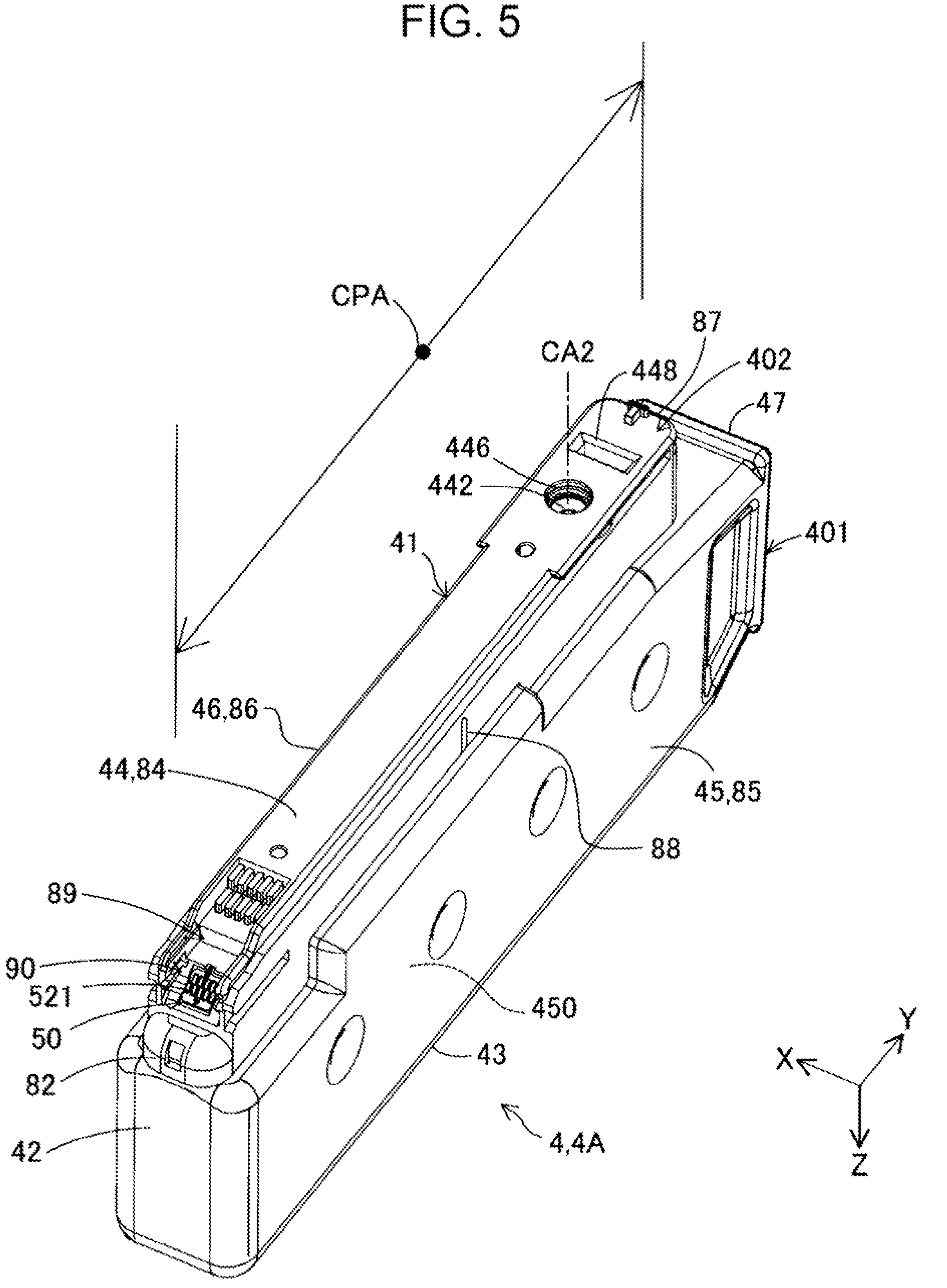
FIG. 5 is a perspective view of a first-type cartridge.
Figure 6:
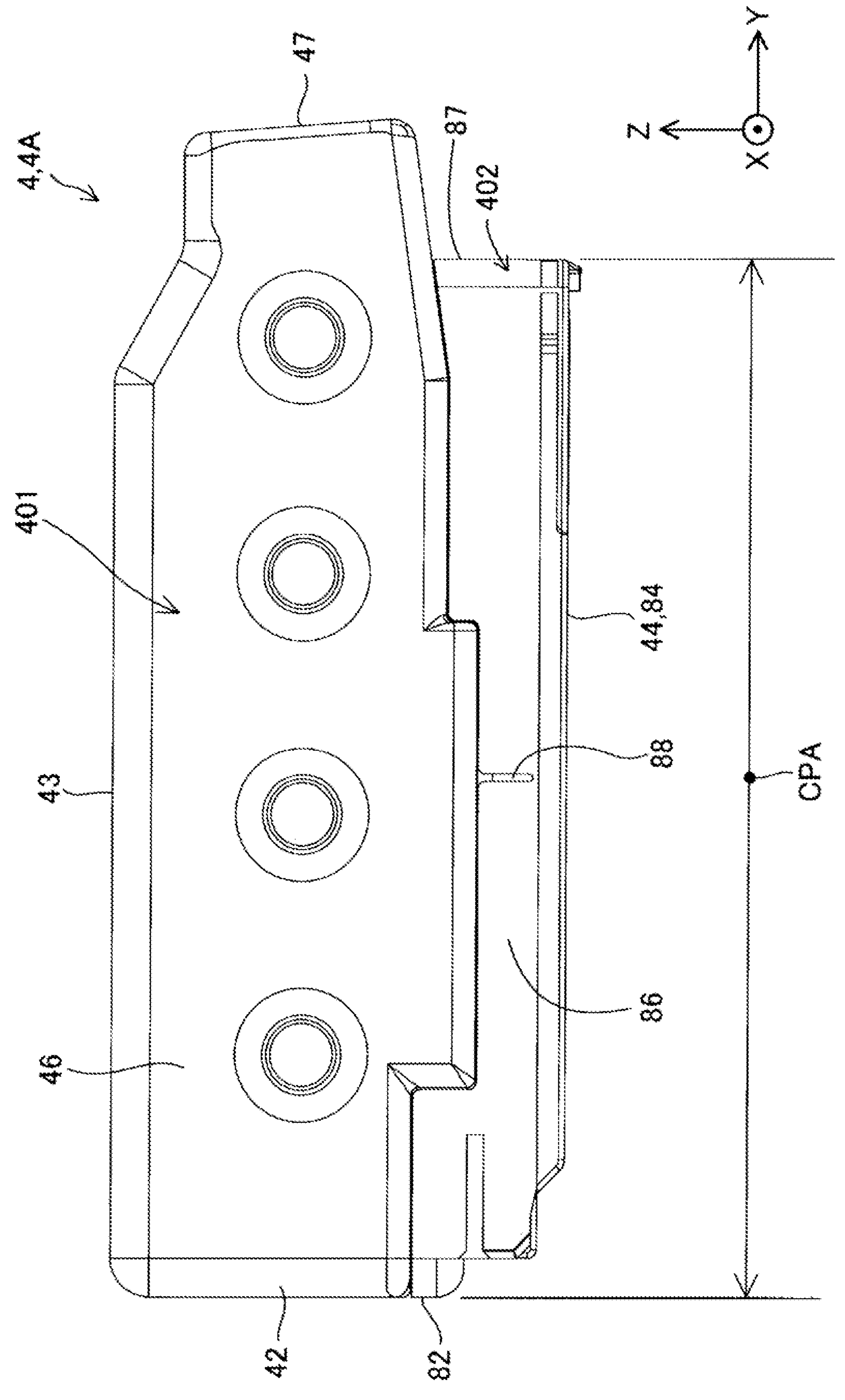
FIG. 6 is a side view of the first-type cartridge.
Figure 7:
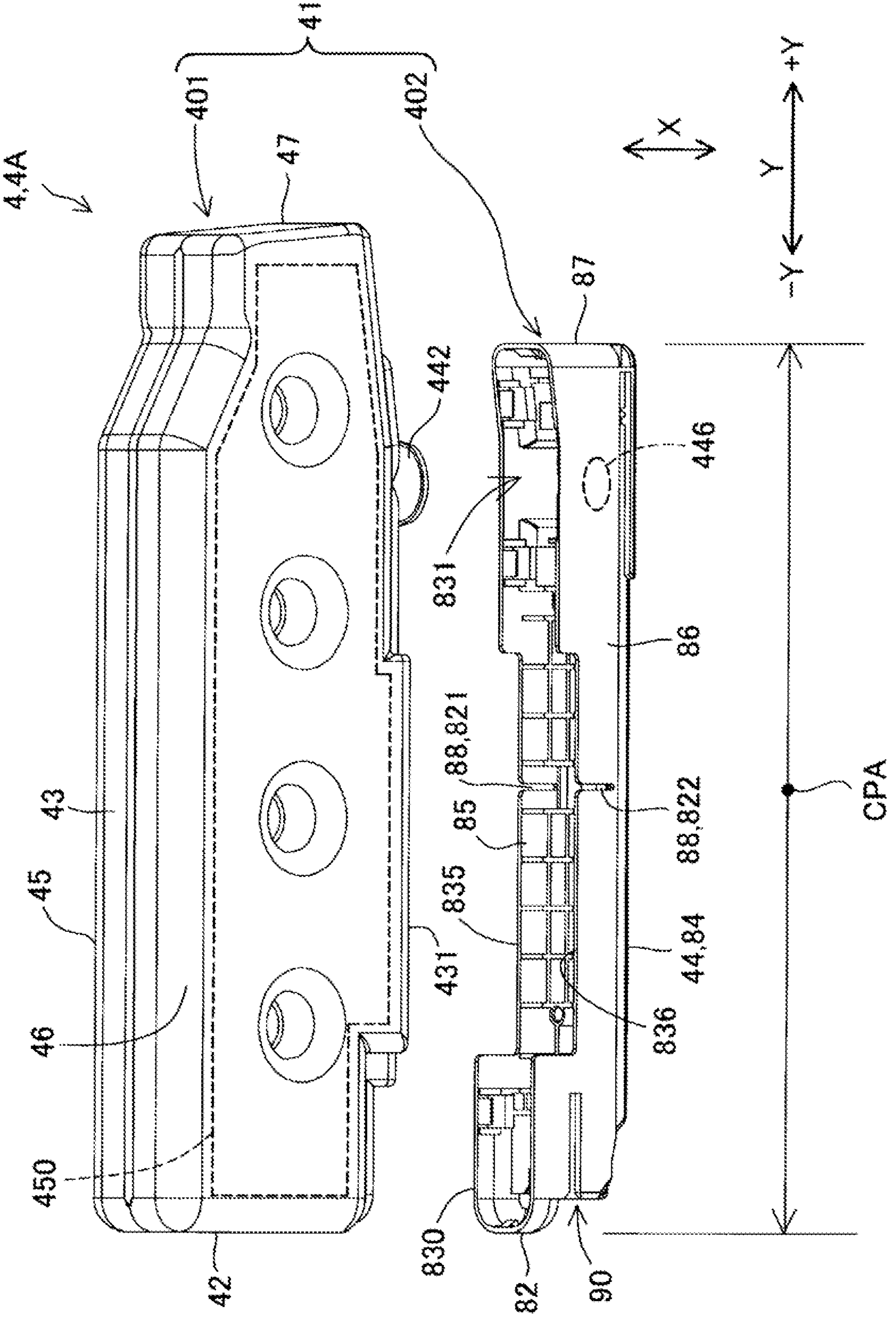
FIG. 7 is an exploded perspective view of the first-type cartridge.

FIG. 5 is a perspective view of the first-type cartridge 4A. FIG. 6 is a side view of the first-type cartridge 4A. FIG. 7 is an exploded perspective view of the first-type cartridge 4A. The first-type cartridge 4A and the second-type cartridge 4B illustrated in FIG. 1 have a difference in volume of the liquid containing portion 450. Specifically, a width of a liquid containing body 401 (to be described later) of the first-type cartridge 4A is larger than a width of the liquid containing body 401 of the second-type cartridge 4B. Therefore, the volumes of the liquid containing portions 450 in the first-type cartridge 4A and the second-type cartridge 4B are different. For another configuration such as the adapter 402, since the first-type cartridge 4A has the same configuration as the second-type cartridge 4B, in the following, detailed descriptions of the cartridge 4 will be described with reference to the first-type cartridge 4A. In the following, the first-type cartridge 4A is simply referred to as the cartridge 4. In the drawings illustrating the cartridge 4, the X, Y, and Z directions are based on a completed state of the terminal coupling process, which is a state in which the insertion of the cartridge 4 into the cartridge mounting portion 6 is completed. That is, in the drawings illustrating the cartridge 4, the X, Y, and Z directions are based on a state before the supply portion coupling process in which the support member 610 is rotatably moved.

As illustrated in FIG. 5, an appearance of the cartridge 4 has a substantially rectangular parallelepiped shape. In the cartridge 4, a direction along the −Y direction, which is the insertion direction of the cartridge mounting portion 6, is defined as a longitudinal direction, the X direction is defined as a lateral direction as a width direction, and the Z direction is defined as a height direction. A dimension of the cartridge 4 in the longitudinal direction is the largest, and a dimension of the cartridge 4 in the lateral direction is the smallest.

As illustrated in FIG. 5, the cartridge 4 includes a cartridge main body 41, and the circuit board 50 attached to the cartridge main body 41. As illustrated in FIG. 7, the cartridge main body 41 is composed of two members. Specifically, the cartridge main body 41 includes the liquid containing body 401, and the adapter 402 attached to the liquid containing body 401 by engagement. That is, the liquid containing body 401 has a plurality of containing body attachment portions such as engagement grooves for attaching the adapter 402. In addition, the adapter 402 has a plurality of adapter attachment portions, such as engagement claws, corresponding to a plurality of attachment portions of the liquid containing body 401.

The liquid containing body 401 and the adapter 402 have the largest dimensions in the Y direction, which is the longitudinal direction. The liquid containing body 401 and the adapter 402 are each molded by, for example, injection molding a synthetic resin such as polypropylene. The liquid containing body 401 and the adapter 402 may be formed of the same material or different materials. In the present embodiment, at least a part of the liquid containing body 401 to which the adapter 402 is attached has a higher rigidity than the adapter 402. A degree of the rigidity can be adjusted by a thickness, shape, or material of the member.

As illustrated in FIG. 5, the cartridge main body 41 has a front wall 42, a rear wall 47, an upper wall 43, a bottom wall 44, a first side wall 45, a second side wall 46, and a corner portion 89. The walls 42, 43, 44, 45, 46, and 47 are referred to as surfaces 42, 43, 44, 45, 46, and 47, respectively. The front wall 42 and the rear wall 47 face each other in the Y direction along the insertion direction. The upper wall 43 and the bottom wall 44 face each other in the Z direction. The Z direction is parallel with the central axis CA2 along the direction in which the liquid supply portion 442 extends. The first side wall 45 and the second side wall 46 face each other in the X direction.

The front wall 42 is located on the insertion direction side in which the cartridge 4 is inserted into the cartridge mounting portion 6. That is, the front wall 42 forms an insertion distal end surface on the −Y direction side, which is the insertion direction side. That is, the rear wall 47 forms a surface on the +Y direction side, which is the removal direction. The upper wall 43 is located on the +Z direction side, and intersects with the front wall 42 and the rear wall 47. The bottom wall 44 is located on the −Z direction side, which is the gravity direction side in the mounted state, and forms a coupling distal end surface in the coupling direction D2 illustrated in FIG. 3. That is, the bottom wall 44 is located on the coupling direction D2 side. The bottom wall 44 intersects with the front wall 42 and the rear wall 47. An insertion opening portion 446 through which the liquid introduction portion 642 is inserted is formed in the bottom wall 44. A positional relationship in which the insertion opening portion 446 and the liquid supply portion 442 overlap is made, when the cartridge 4 is viewed from the bottom wall 44. In the present embodiment, the liquid supply portion 442 is arranged so that the central axis CA2 of the liquid supply portion 442 passes through the insertion opening portion 446.

The first side wall 45 is located on the −X direction side, and the second side wall 46 is located on the +X direction side. The first side wall 45 intersects with the front wall 42 and the rear wall 47, and the second side wall 46 intersects with the upper wall 43 and the bottom wall 44. The corner portion 89 is provided at a corner part where the front wall 42 intersects with the bottom wall 44. The corner portion 89 has a terminal arrangement portion 90 having a recess shape recessed inwardly. The circuit board 50 is attached to the terminal arrangement portion 90.

As illustrated in FIG. 7, the liquid containing body 401 has the liquid containing portion 450 containing the liquid, and the liquid supply portion 442. The liquid supply portion 442 is a cylindrical member protruding from a containing body bottom wall 431 of the liquid containing body 401 that faces the upper wall 43.

The adapter 402 includes an adapter front wall 82, an adapter rear wall 87, an adapter bottom wall 84, a first adapter side wall 85, and a second adapter side wall 86. The adapter front wall 82 constitutes a part of the front wall 42, and forms an insertion distal end surface on the −Y direction side which is the insertion direction. The adapter rear wall 87 constitutes a part of the rear wall 47, and faces the adapter front wall 82 in the Y direction. The adapter bottom wall 84 constitutes the bottom wall 44. The adapter bottom wall 84 intersects with the adapter front wall 82 and the adapter rear wall 87. As illustrated in FIG. 5, the insertion opening portion 446 through which the liquid introduction portion 642 is inserted is formed in the adapter bottom wall 84.

The first adapter side wall 85 intersects with the adapter bottom wall 84, and extends in the Y direction which is a longitudinal direction of the adapter 402. The first adapter side wall 85 is a plate-shaped wall that is raised from the adapter bottom wall 84 toward the liquid containing body 401. The second adapter side wall 86 faces the first adapter side wall 85 in the X direction which is a width direction of the adapter 402. The second adapter side wall 86 intersects with the adapter bottom wall 84, and extends in the Y direction which is the longitudinal direction of the adapter 402. The second adapter side wall 86 is a plate-shaped wall that is raised from the adapter bottom wall 84 toward the liquid containing body 401.

The adapter 402 has a recess shape having the adapter bottom wall 84 as a bottom. A side of the adapter 402 that faces the adapter bottom wall 84 is open, and the liquid supply portion 442 is arranged in the recess of the adapter 402 via the opening. A part of the adapter 402 in which the liquid supply portion 442 is arranged is referred to as a supply portion arrangement portion 831. The opening located opposite to the adapter bottom wall 84 is partitioned by upper end surfaces 830 of the first adapter side wall 85, the second adapter side wall 86, the adapter front wall 82, and the adapter rear wall 87. Here, among the upper end surface 830, an upper end surface of the first adapter side wall 85 is referred to as a first upper end surface 835, and an upper end surface of the second adapter side wall 86 is referred to as a second upper end surface 836.

As illustrated in FIG. 5, the adapter 402 includes the terminal arrangement portion 90 and the insertion opening portion 446, which are described above. The terminal arrangement portion 90 is provided at a corner portion 89 where the adapter front wall 82 intersects with the adapter bottom wall 84. The terminal arrangement portion 90 is located on one end side of the adapter 402 in the longitudinal direction, and the circuit board 50 including the cartridge-side terminal 521 that is electrically coupled to the apparatus-side terminal 721 is arranged on the terminal arrangement portion 90. In the present embodiment, the one end side of the adapter 402 in the longitudinal direction is the insertion direction side of the cartridge 4. The insertion opening portion 446 is located on the other end side of the adapter 402 in the longitudinal direction. That is, when the center of the adapter 402 in the longitudinal direction is defined as an adapter center CPA, the terminal arrangement portion 90 is located between the adapter center CPA and the adapter front wall 82 in the longitudinal direction of the adapter 402. In addition, the insertion opening portion 446 is located between the adapter center CPA and the adapter rear wall 87 in the longitudinal direction of the adapter 402.

As illustrated in FIG. 7, the adapter 402 has a notch 88 located between the terminal arrangement portion 90 and the insertion opening portion 446 in the longitudinal direction of the adapter 402. The notch 88 is formed in each of the first adapter side wall 85 and the second adapter side wall 86. The notch 88 formed in the first adapter side wall 85 is referred to as a first notch 821, and the notch 88 formed in the second adapter side wall 86 is referred to as a second notch 822. The notch 88 is used when used without distinguishing the first notch 821 and the second notch 822.

The first notch 821 has an elongated shape extending from the first upper end surface 835 of the first adapter side wall 85 toward the adapter bottom wall 84. The first notch 821 penetrates the first adapter side wall 85 in a thickness direction of the adapter 402. The second notch 822 has an elongated shape extending from the second upper end surface 836 of the second adapter side wall 86 toward the adapter bottom wall 84. The second notch 822 penetrates the second adapter side wall 86 in the thickness direction of the adapter 402. The notch 88 has a shape extending from the upper end surface 835 of the first adapter side wall 85 or the upper end surface 836 of the second adapter side wall 86 toward the adapter bottom wall 84, such that the notch 88 can be easily formed in the first adapter side wall 85 or the second adapter side wall 86.

The first notch 821 and the second notch 822 are arranged at a position facing each other in the width direction of the adapter 402. The first notch 821 and the second notch 822 are each formed in the adapter center CPA or at a position close to the adapter center CPA in the longitudinal direction of the adapter 402. The position where the first notch 821 and the second notch 822 are formed is not limited to the above, and the first notch 821 and the second notch 822 may be formed between the terminal arrangement portion 90 and the insertion opening portion 446 in the longitudinal direction of the adapter 402. The first notch 821 and the second notch 822 each may be formed when injection molding the adapter 402 with a shape defined by a mold in advance, or may be formed by subjecting the adapter 402 to notch after the injection molding.

Here, the adapter 402 is formed by molding a synthetic resin. In addition, since a side of the adapter 402 is open facing the adapter bottom wall 84, the adapter 402 is easily deformed during manufacturing compared to the liquid containing body 401 whose entire body is formed on the wall. For example, the adapter 402 is deformed by shrinking due to cooling after molded, a dimension of the adapter 402 may thus deviate from a design value. However, according to the embodiment, the rigidity of the adapter can be reduced by the notch. As a result, when attaching the adapter 402 to the liquid containing body 401, the adapter 402 can be deformed in a shape that is attachable to the liquid containing body 401. That is, when attaching the adapter 402 to the liquid containing body 401, a shape of the adapter 402 can be corrected so that the adapter attachment portion of the adapter 402 is located at a position corresponding to the containing body attachment portion of the liquid containing body 401. As a result, an external dimension of the adapter 402 is determined in a state in which the adapter 402 is attached to the liquid containing body 401, such that it is possible to prevent a positional deviation of an element that cooperates with the cartridge mounting portion 6, such as the terminal arrangement portion 90, the insertion opening portion 446, or the supply portion positioning portion 448, with respect to the liquid containing body 401. Further, since the shape of the adapter 402 can be corrected, the adapter 402 does not need to increase dimensional accuracy during manufacturing.

According to the embodiment, a plurality of notches 88 are formed as illustrated in FIG. 7. As a result, since the rigidity of the adapter 402 can be further reduced, the adapter 402 can be deformed in a shape that is more easily attachable to the liquid containing body 401. According to the embodiment, as illustrated in FIG. 7, the notches 88 are formed in the first adapter side wall 85 and the second adapter side wall 86 that extend in the longitudinal direction of the adapter 402. As a result, even if the dimensional accuracy of the adapter 402 alone is reduced due to shrinkage after molded, the adapter 402 can be deformed in a shape that is easily attachable to the liquid containing body 401 by applying an external force to the adapter from both sides of the notch 88 in the longitudinal direction.

According to the embodiment, as illustrated in FIG. 7, the first adapter side wall 85 has the first notch 821, and the second adapter side wall 86 has the second notch 822. As a result, the adapter 402 can be deformed in a shape that is much more easily attachable to the liquid containing body 401.

B. Other Embodiments

B-1. Other Embodiment 1

In the present embodiment, as illustrated in FIG. 7, two notches 88 are provided, but one or three or more notches 88 may be provided. In addition, a position where the notch 88 is formed is not limited to the first adapter side wall 85 or the second adapter side wall 86. For example, the notch 88 may be formed in the adapter bottom wall 84.

B-2. Other Embodiment 2

The present disclosure is not limited to an ink jet printer and an ink cartridge thereof, but can be applied to a cartridge mounted in any printing apparatus that ejects other liquids except for ink. For example, various printing apparatuses and cartridges thereof can be applied as follows.

(1) Image recording apparatus such as a fax machine
(2) Printing apparatus that ejects color materials used in manufacturing a color filter for an image display apparatus such as a liquid crystal display
(3) Printing apparatus that ejects electrode materials used in forming electrodes such as an organic electroluminescence (EL) display or field emission display (FED)
(4) Printing apparatus that ejects a liquid including bioorganic matters used in manufacture of a biochip
(5) Sample printing apparatus as precision pipette
(6) Printing apparatus of lubricating oil
(7) Printing apparatus of resin liquid
(8) Printing apparatus that ejects lubricating oil to a precision machine, such as a watch and a camera, with a pinpoint
(9) Printing apparatus that ejects a transparent resin liquid, such as an ultraviolet curable resin liquid, to a substrate to form a micro-hemispherical lens (optical lens) used for an optical communication element or the like
(10) Printing apparatus that ejects an acidic or alkaline etching solution to etch a substrate or the like
(11) Printing apparatus including a liquid ejecting head that discharges any other minute amount of liquid droplets The "liquid droplets" refers to a state of the liquid discharged from the printing apparatus, and includes those having trails with particles, tears, or threads. In addition, the "liquid" here may be any material that can be ejected by the liquid ejecting apparatus. For example, the "liquid" may be a material in a state where the substance is in a liquid phase, and liquid materials with high or low viscosity and liquid materials such as sol, gel water, other inorganic solvents, organic solvents, solutions, liquid resins, and liquid metal are also included in the "liquid". In addition, the "liquid" includes not only a liquid as one state of a substance but also a "liquid" obtained by dissolving, dispersing or mixing particles of a functional material made of a solid such as a pigment or metal particles in a solvent. In addition, representative examples of the liquid include ink and liquid crystal as described in the above embodiment. Here, the ink includes various liquid compositions such as normal water-based ink and oil-based ink, gel ink, and hot-melt ink.

C. Other Aspects

The present disclosure is not limited to the above-described embodiment, and can be realized with various configurations without departing from the spirit of the present disclosure. For example, the technical features of the embodiments corresponding to the technical features in each embodiment described below can be appropriately replaced or combined to solve some or all of the above-described problems, or to achieve some or all of the above effects. In addition, when the technical feature is not described as essential in the present specification, it can be deleted as appropriate. In addition, when the technical feature is not described as essential in the present specification, it can be appropriately deleted.

(1) According to an aspect of the present disclosure, there is provided a cartridge that is detachably mounted in a cartridge mounting portion of a printing apparatus including an apparatus-side terminal and a liquid introduction portion receiving a liquid. The cartridge includes: a liquid containing body including a liquid containing portion containing the liquid and a liquid supply portion; and an adapter attached to the liquid containing body and including a terminal arrangement portion which is located on one end side of the adapter in a longitudinal direction and in which a cartridge-side terminal electrically coupled to the apparatus-side terminal is arranged, and an insertion opening portion through which the liquid introduction portion is inserted, in which the adapter has a notch located between the terminal arrangement portion and the insertion opening portion in the longitudinal direction. According to the aspect, a rigidity of the adapter can be reduced by the notch. As a result, when attaching the adapter to the liquid containing body, the adapter can be deformed in an attachable shape. Thus, since an external dimension of the adapter can be determined in a state in which the adapter is attached to the liquid containing body, it is possible to prevent a positional deviation of the terminal arrangement portion or the insertion opening portion with respect to the liquid containing body.

(2) In the aspect, the notch may be formed in plural. According to the aspect, since the rigidity of the adapter can be further reduced, the adapter can be deformed in a shape that is more easily attachable to the liquid containing body.

(3) In the aspect, the adapter may have an adapter bottom wall in which the insertion opening portion is formed, and an adapter side wall intersecting with the adapter bottom wall and extending in the longitudinal direction, and the notch may be formed in the adapter side wall. According to the aspect, the notch may be formed in the adapter side wall extending in the longitudinal direction. As a result, even if the dimensional accuracy of the adapter alone is reduced, the adapter can be deformed in a shape that is easily attachable to the liquid containing body by applying an external force to the adapter from both sides of the notch in the longitudinal direction.

(4) In the aspect, the adapter side wall may have a first adapter side wall and a second adapter side wall facing the first adapter side wall, the first adapter side wall may have a first notch as the notch, and the second adapter side wall may have a second notch as the notch. According to the aspect, since the adapter side wall has the first adapter side wall and the second adapter side wall, the adapter can be deformed in a shape that is easily attachable to the liquid containing body.

(5) In the aspect, the adapter side wall may have an upper end surface partitioning an opening located opposite to the adapter bottom wall, and the notch may extend from the upper end surface of the adapter side wall toward the adapter bottom wall. According to the aspect, the notch may be easily formed in the adapter side wall.

In addition to the aspect described above, the present disclosure can be realized as an aspect such as a method of manufacturing a cartridge.

What is claimed is:

1. A cartridge that is detachably mounted in a cartridge mounting portion of a printing apparatus including an apparatus-side terminal and a liquid introduction portion receiving a liquid, the cartridge comprising:

a liquid containing body including a liquid containing portion containing the liquid and a liquid supply portion; and an adapter attached to the liquid containing body and including a terminal arrangement portion which is located on one end side of the adapter in a longitudinal direction and in which a cartridge-side terminal electrically coupled to the apparatus-side terminal is arranged, and an insertion opening portion through which the liquid introduction portion is inserted, wherein the adapter has a first end and a second end in the longitudinal direction, a center between the first end and the second end in the longitudinal direction, and a notch located at the center, the terminal arrangement portion is located closer to the first end than to the center in the longitudinal direction, and the insertion opening portion is located closer to the second end than to the center in the longitudinal direction.

2. The cartridge according to claim 1, wherein the notch is formed in plural.

3. The cartridge according to claim 1, wherein the adapter has an adapter bottom wall in which the insertion opening portion is formed, and an adapter side wall intersecting with the adapter bottom wall and extending in the longitudinal direction, and the notch is formed in the adapter side wall.

4. The cartridge according to claim 3, wherein the adapter side wall has a first adapter side wall and a second adapter side wall facing the first adapter side wall, the first adapter side wall has a first notch as the notch, and the second adapter side wall has a second notch as the notch.

5. The cartridge according to claim 3, wherein the adapter side wall has an upper end surface partitioning an opening located opposite to the adapter bottom wall, and the notch extends from the upper end surface of the adapter side wall toward the adapter bottom wall.

* * * * *